April 25, 1967

C. S. MORRISON ETAL 3,315,449

CROP HARVESTER

Filed April 15, 1964

INVENTORS
C. S. MORRISON
H. H. DENISON
K. R. THOMAS

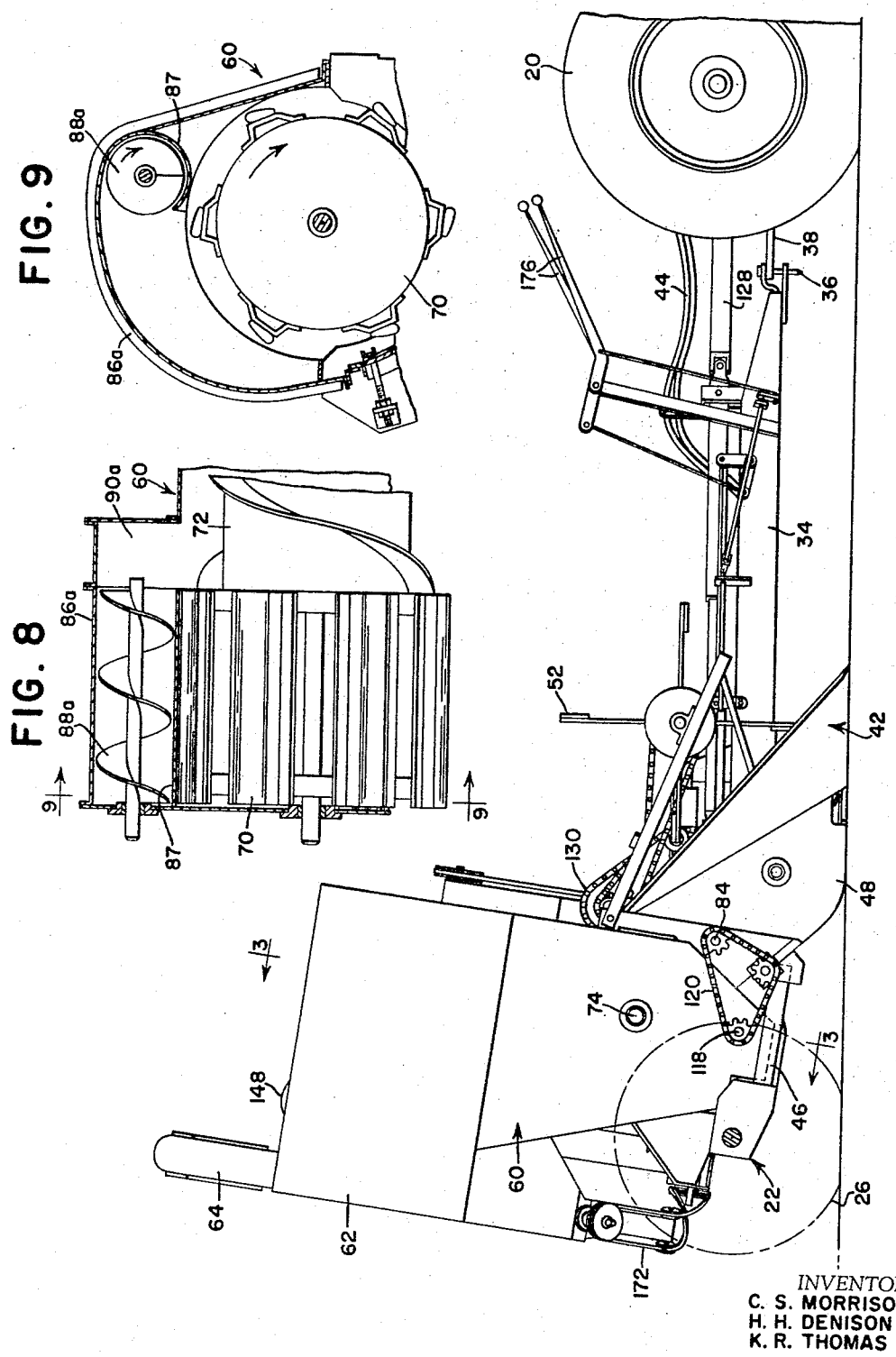

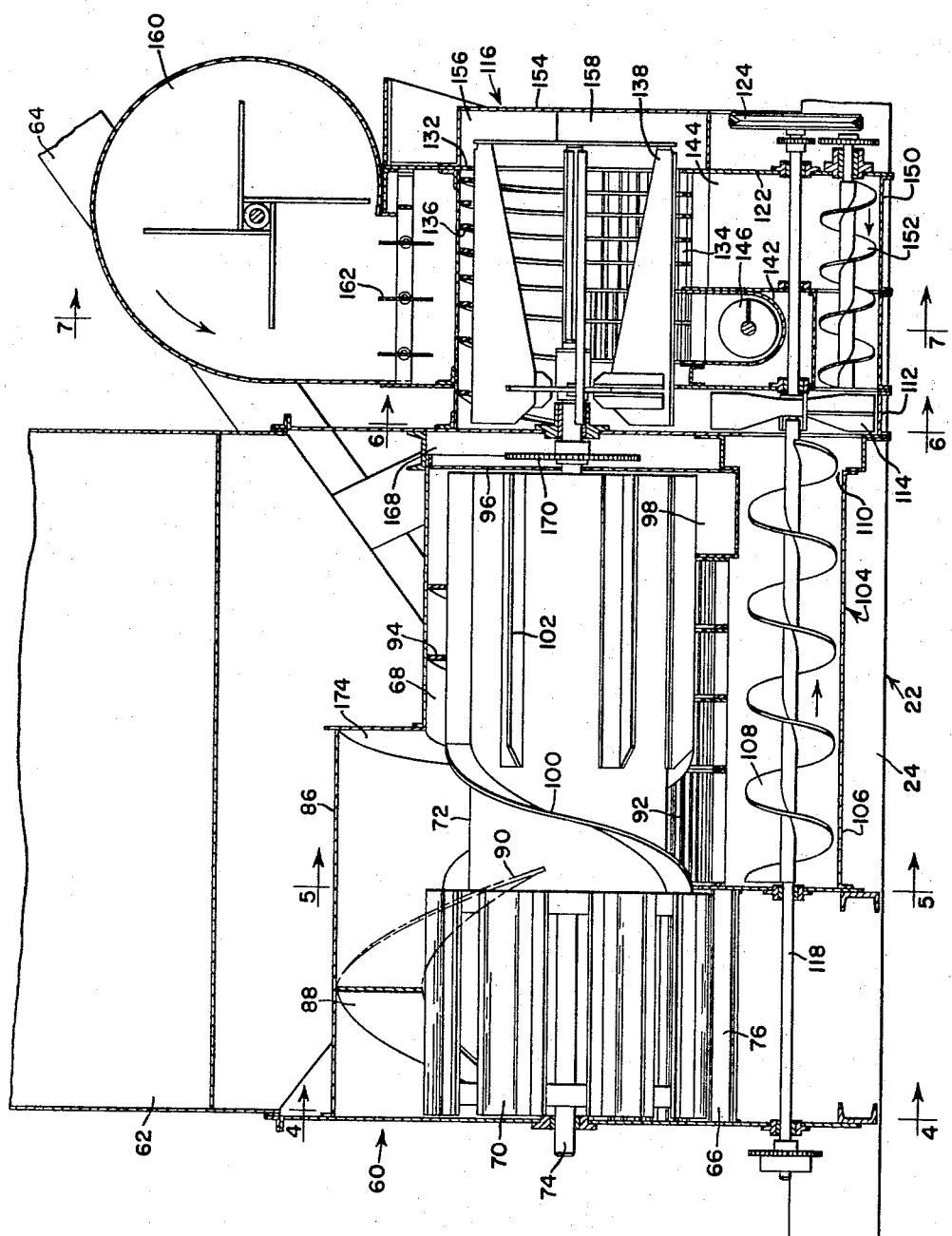

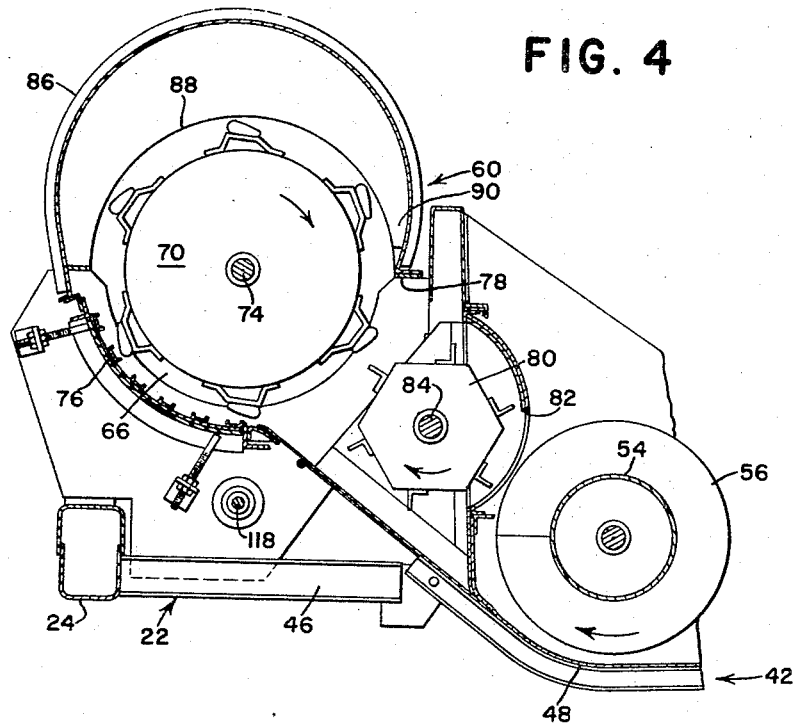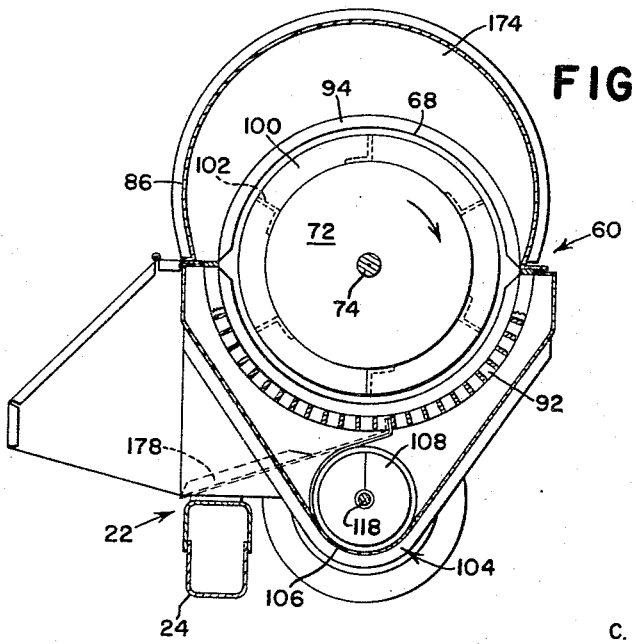

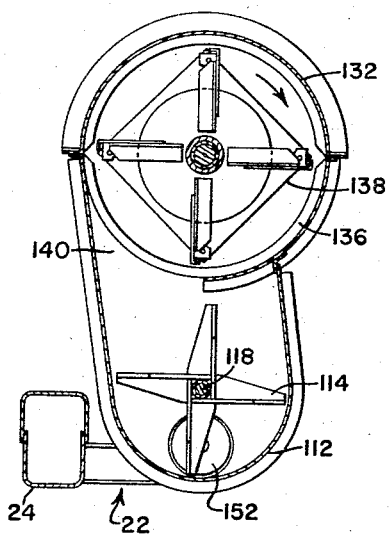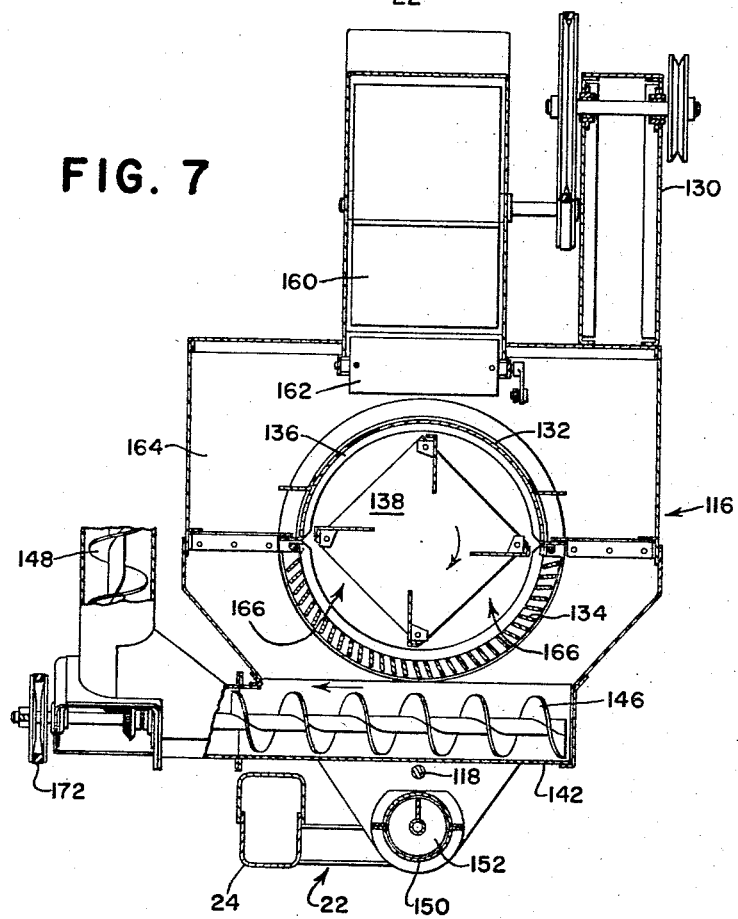

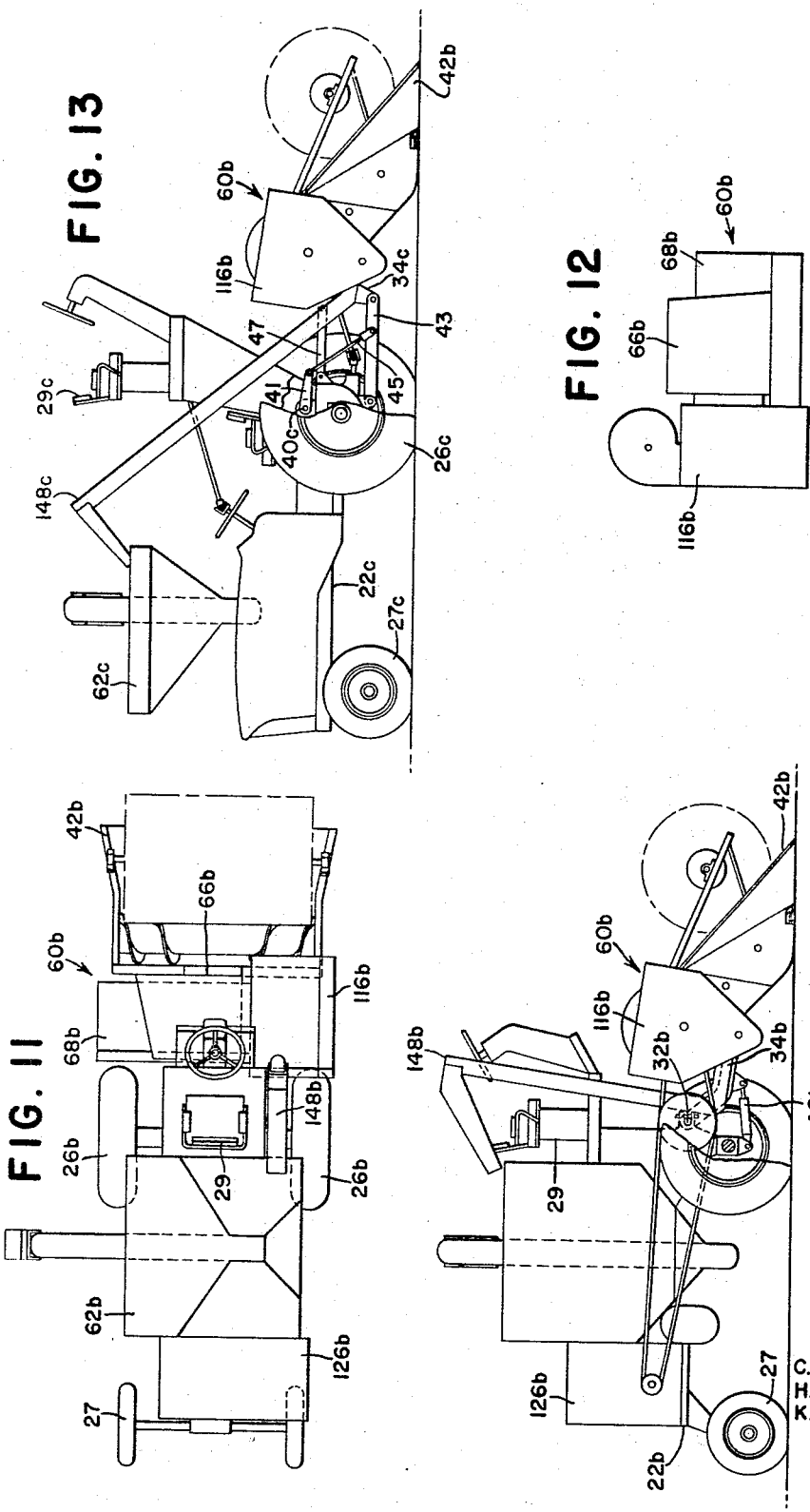

United States Patent Office 3,315,449
Patented Apr. 25, 1967

3,315,449
CROP HARVESTER
Charles S. Morrison, Henry H. Denison, and Kenneth R. Thomas, all of Moline, Ill., assignors to Deere & Company, Moline, Ill., a corporation of Delaware
Filed Apr. 15, 1964, Ser. No. 359,947
20 Claims. (Cl. 56—21)

This invention relates to a crop harvester and more particularly to that type of machine known as a combine, inasmuch as it combines the operations of harvesting and threshing or separating crops.

The principal object of the invention is the provision of an improved crop harvester utilizing rotary threshing and separating mechanisms, with these two mechanisms being arranged coaxially, and preferably transverse to the line of travel of the machine. A still further object resides in the ultilization in a coaxial threshing-separating mechanism of crop-transfer means for moving the threshed crop from the threshing portion of the unit to the separating portion. It is also an object of the invention to arrange a coaxial cleaning means in alinement with the threshing and separating unit and to provide means for moving separated crops from the separating portion of the unit to the cleaning casing.

The foregoing and other important objects and desirable features inherent in and encompassed by the invention will become apparent as preferred embodiments thereof are disclosed in detail in the ensuing description and accompanying sheets of drawings, the figures of which are described below.

FIG. 2 is a side elevational view of the same, with the near supporting wheel shown schematically so as to expose parts that would otherwise be covered.

FIG. 3 is an enlarged transverse section taken substantially on the line 3—3 of FIG. 2.

Figure 1:
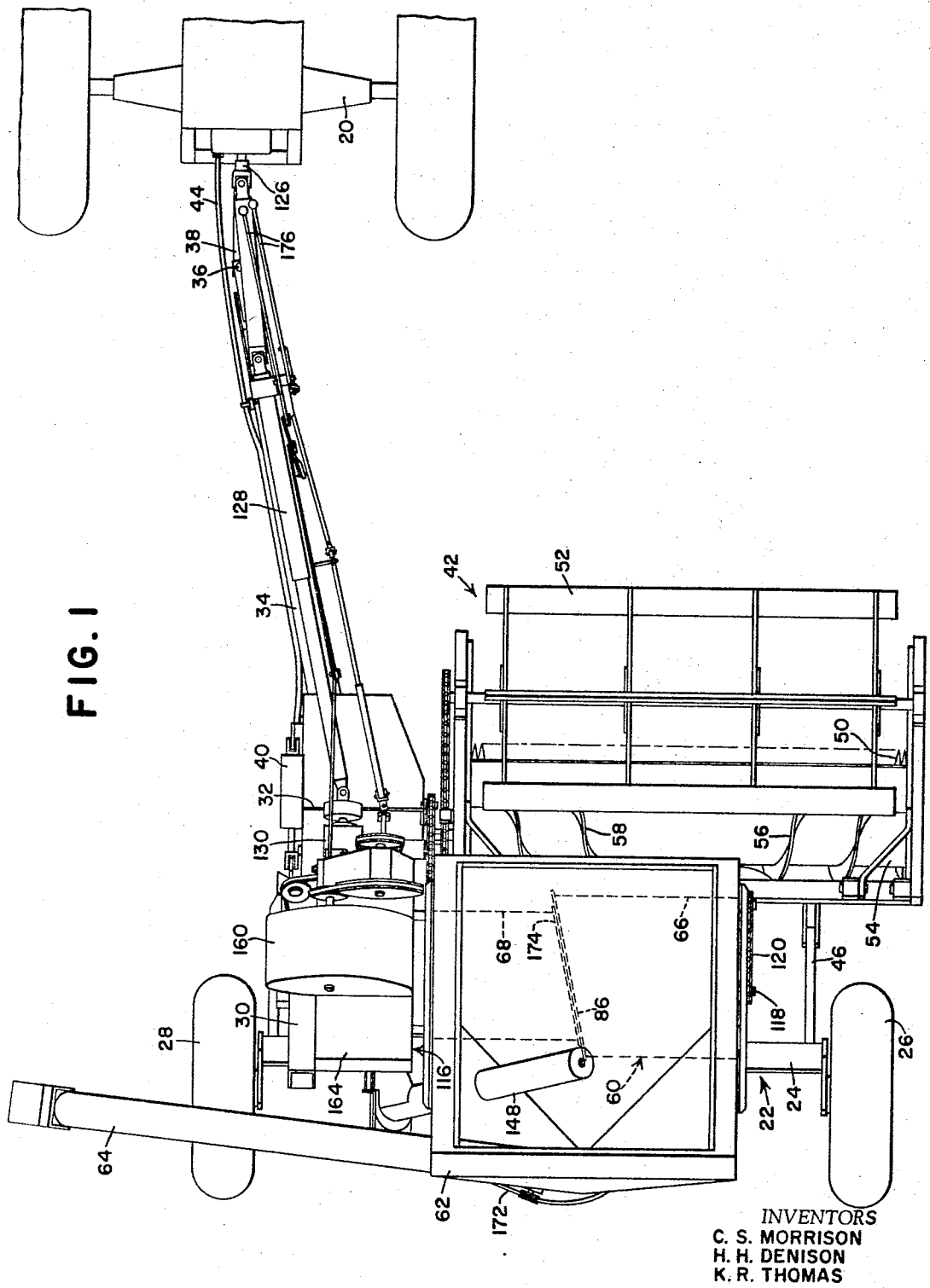
FIG. 1 is a plan view of a representative tractor-drawn machine.

FIGS. 4, 5, 6 and 7 are respectively longitudinal sections taken on the lines 4—4, 5—5, 6—6 and 7—7 of FIG. 3.

FIG. 8 is a fragmentary view showing a modified form of means for transferring crops from the threshing portion to the separating portion of the unit.

FIG. 9 is a fragmentary section as seen generally along the line 9—9 of FIG. 8.

FIG. 10 is side view of one form of the improved harvester-thresher-separator unit mounted on a self-propelled frame.

FIG. 11 is a plan view of the same.

FIG. 12 is a partial front view.

FIG. 13 is a side view of the unit mounted on a typical agricultural tractor.

FIGS. 1 and 2 are referred to initially for the purpose of establishing an overall picture of the tractor-drawn type of machine. In these figures, the numeral 20 designates the rear portion of a typical agricultural tractor. The basic main frame of the crop harvester is denoted by the numeral 22. The wheeled part of this frame includes a transverse tubular axle support 24 carried at its right- and left-hand ends respectively on wheels 26 and 28. At the left-hand side of the machine, the frame includes a forwardly extending rigid section 30 which is hinged in the area of the numeral 32, on a transverse axis, to a forwardly extending draft tongue 34 which, at its forward end, is connected by a clevis pin 36 to the tractor drawbar 38. A hydraulic cylinder 40, appropriately connected between the frame section 30 and the draft tongue 34 is selectively extensible and retractable to vary the angle about the hinge 32 and thereby to tilt the main frame on the wheels 26 and 28 for the purpose of adjusting the cutting height of a harvester device, indicated in its entirety by the numeral 42. The tractor is conventionally equipped with a hydraulic system from which a hose line 44 runs rearwardly along the draft tongue 34 to the cylinder 40. Any appropriate valve means, not shown, may be used to control the cylinder.

The harvesting device 42 is appropriately supported on the main frame, as means of forwardly projecting arms 46 secured to the axle support 24. The harvesting device chosen here for purposes of illustration is of the grain-harvesting type, comprising a header or platform in the form of a trough 48 of substantial width relative to the line of advance of the machine. The forward edge of the trough is bordered by a cutter bar 50 over which a reel 52 operates in conventional fashion to cut standing grain and move it rearwardly onto the trough. Means is provided for narrowing the gathered crop on the trough, this means in the present case comprising a tubular member 54 having right- and left-hand auger flights 56 and 58, respectively, thereon. These auger flights operate respectively over right- and left-hand portions of the trough and move the crop oppositely inwardly to a central portion of the trough for discharge to a threshing and separating housing structure 60, lying lengthwise or parallel to and closely behind the harvesting device 42. Just above the housing structure 60 is a receptacle in the form of a grain tank 62, equipped with an unloading auger 64.

The housing structure 60 is essentially cylindrical in cross section and has its axis crosswise of the direction of travel; or slated otherwise, parallel to the axis of the trough or auger 54 and therefore lying closely behind the harvesting device 42. This enables a compact organization of parts and facilitates crop transfer from the harvesting device to the threshing and separating mechanism. Considered from the standpoint of the direction of travel, the right-hand portion of the structure 60 is a threshing portion 66 and the remainder or left-hand portion is a separating portion 68. Coaxially journaled in the structure 60 in end-to-end relationship are a threshing cylinder 70 and a drum or impeller or equivalent rotary element 72. In the preferred embodiment illustrated, the cylinder and element 72 are mounted on a common cross shaft 74.

The cylinder 70 may be of typical threshing cylinder construction and rotates in the direction of the arrow shown in FIG. 4, cooperating with a concave 76 at the lower rear portion of the threshing portion 66. The cylindrical wall of the threshing portion is provided at its front with an inlet opening 78 which is in fore-and-aft register with crop-discharge means operative to transfer crops rearwardly and upwardly from the harvesting device to the threshing portion 66. In the present case, the crop-discharge means, or part thereof, comprises a rotary element 80 which, via a front opening 82, receives crops from the auger 54 and delivers them to the threshing portion 66. The element or beater 80 is mounted on a cross shaft 84, driven from its right-hand end as shown in FIG. 2.

Because of the direction of rotation of the cylinder 70 and its cooperation with the concave 76, crops are carried upwardly and rearwardly and then forwardly, in which area the housing structure is radially enlarged or eccentrically formed as shown at 86. This eccentric portion is at least axially coextensive with the axial dimension of the cylinder and is provided internally with crop-transfer means for causing the threshed crops to move axially as well as circumferentially so as to be delivered to the impeller or drum 72. In this form of the invention, the crop-transfer means comprises a blade-like member 88 of semi-helical form, appearing somewhat as a crescent as seen in FIG. 4, the inner arcuate edge of the member closely surrounding the cylinder 70 and the terminal end extending axially and circumferentially into the cylinder-adjacent portion of the threshing portion 68. The sectional view in FIG. 3 would omit the terminal end of the semi-helix 88 but this has been shown in dot-dash lines at 90 to facilitate an understanding of the structure.

Another form of crop-transfer means is shown in FIGS. 8 and 9, wherein reference characters already used are repeated where the structure is the same. For example, there are visible in these figures the cylinder 70, impeller or drum 72 and housing structure 60. However, the enlarged portion differs somewhat from that previously described at 86 and is accordingly designated here by the numeral 86a. The general disposition of the portion 86a corresponds to that of the part 86, but is further formed to establish an auger trough 87 over which the crop-transfer means, here in the form of an auger 88a operates to convey threshed material from the cylinder to the impeller 72. An extension of the separating portion, shown at 90a affords an inlet for the crops to move to the impeller 72.

The separating portion of the structure 60 follows that forming the subject matter of U.S. Patent 3,122,499, of Feb. 25, 1964. To this extent, then, the upper semi-cylindrical half of the portion 68 is imperforate, and the lower portion is in the form of a grate 92. A continuous helix 94 is wound substantially end-to-end of the separating portion, traveling over the imperforate portion as well as over the grate, and terminating short of the end wall 96 of the housing, at which portion a straw-discharge opening is afforded at 98. In the present posture of the structure, the opening 98 leads fore and aft of the machine for discharge of straw, grain being separated from the straw and discharged downwardly through the grate 92 as the impeller rotates. To assist movement of the material axiswise of the impeller before the helix 94 starts, the impeller carries a helical section 100 at its cylinder-adjacent end. The remainder of the impeller is provided with a plurality of uniformly circumferentially spaced blades 102 running lengthwise thereof and so radially dimensioned as to travel in close-tolerance relationship to the inner arcuate edges of the helix 94. Thus, material is moved circumferentially as well as lengthwise of the structure, the grain, as aforesaid, falling through the grate 92 and the straw being moved toward the end wall 96 for discharge through the straw discharge outlet 98.

Beneath the separating portion 68 of the structure 60 is a crop-transfer means 104, here made up of an auger trough 106 within which an auger 108 operates to carry grain to the right of the figure (to the left-hand side of the machine), through an opening 110 and into a chamber 112 in which a paddle 114 operates to lift the grain to a cleaning means 116. The auger 108 is carried on a shaft 118 which projects at the right-hand side of the machine to establish a chain drive at 120 for the previously described crop-transfer beater 80 which is mounted on the shaft 84 (FIG. 2). The shaft also carries the paddle 114 and extends to the left-hand side of the machine, beyond a depending end wall 122 of the cleaning means 116, at which point it carries a sheave 124 which in turn is belt driven from the driving means in any suitable manner, not important here. The drive for the entire machine is taken in the first instance from the power take-off shaft 126 of the tractor through appropriate rearwardly extending telescopic shafting 128, utilizing a gear box and other drive-transfer means as indicated in the general area of the numeral 130 in FIG. 1. These drive details are not important and therefore are not elaborated.

The cleaning means 116 includes what may be regarded as a generally cylindrical casing 132 having substantially its upper half in the form of an imperforate semi-cylindrical wall and its lower portion in the form of a semi-cylindrical grate 134. A helix 136, similar to the helix 94, runs circumferentially and axially of the casing 132, and an impeller 138, mounted on an extension of the cylinder-impeller shaft 74, and therefore coaxial therewith, operates over the grate. The chamber 112 in which the paddle operates to lift separated grain to the clean-in casing has an upwardly opening outlet 140 (FIG. 6) which of course affords an inlet for the interior of the cleaning casing. Grain thrown upwardly into the casing is received by the impeller 138 and, in cooperation with the helix 136, is moved circumferentially and axially, the cleaned grain dropping into two depending portions below the casing 132, one of which portions is a cleaned-grain trough 142 and the other of which is a tailings return chamber 144. A fore-and-aft auger 146 in the cleaned-grain trough 142 (FIG. 7) operates to transfer cleaned grain rearwardly to a junction with an upwardly and inwardly inclined conveyor or auger 148 for delivery to the grain tank 62.

The portion of the grain that moves over the cleaning casing grate 134 beyond the cleaned-grain trough 142 drops through the previously described portion 144 to a return trough 150 in which a return auger 152 operates to convey this grain back to the chamber 112 for redelivery by the paddle 114, via the inlet 140, to the cleaning casing, where it is re-cleaned, ultimately being received by the cleaned-grain auger 148 for delivery to the grain tank 62.

An extension of the cleaning casing housing 132, including an end wall 154 and a semi-cylindrical circumferential wall 156 provides a circumferential outlet at 158 for chaff leaving the cleaning casing.

To facilitate the cleaning of grain, the upper portion of the cleaning casing has an adjunct thereto a cleaning fan means 160 which delivers air downwardly through adjustable baffles 162 to a chamber 164 which substantially surrounds the cylindrical casing 132. As best seen in FIG. 7, it will be seen that the air can enter upwardly through the grate 134 as indicated by the arrows 166, exiting with chaff through the chaff opening 158.

As best seen in FIG. 3, there is an enclosed space 168 between the housing structure 60 and the cleaning means 116, which space is utilized to accommodate a sprocket 170 by means of which the shaft 74 is driven. This establishes a connection to the previously described drive means, illustrated here generally because the specific details are not significant. This is true also of the drive for the cleaned-grain conveyors 146 and 148, a portion of which is shown at 172 merely to explain the presence thereof.

Other details of the machine may be varied without departure from the principle of the coaxial threshing and separating portions, supplemented by the feature of the crop-transfer means 88 (88a) between the two. As best seen in FIG. 3 it will be recognized that the crop stream moving from the cylinder 70 and guided by the means 88 will be substantially as wide as the cylinder. However, the proximate end wall of the enlargement 86, shown at 174 (see also FIG. 1) narrows the stream of crops as it enters the portion of the structure occupied by the cylinder-proximate end of the impeller 72.

Mounted on a forward portion of the draft tongue 134 are two levers, designated generally at 176. These are provided for the purpose of adjusting the reel and connecting and disconnecting various portions of the drive. Again, these elements are described only to explain their presence.

FIG. 5 shows at 178 a discharge plate leading rearwardly from the straw outlet 98.

FIGS. 10–12 illustrate the adaptation of the thresher-separator unit as part of a self-propelled machine and in conjunction with a harvesting device 42b, which may be identical to that previously described. The thresher-separator unit has housing structure 60b mounted closely behind and parallel to the device 42b. This structure and the harvesting device are mounted on a common frame part or structure 34b, pivoted at 32b to the main frame, chassis or wheeled part 22b of the carrying vehicle. Vertical adjustment of the unit 42b–60b may be achieved by one or more hydraulic cylinders, as at 40b. The chassis is self-propelled, having a power plant 126b and the front wheels 26b being traction wheels driven from the power plant. The rear wheels 27 are steerable, and any form of operator's station, as at 29, may be equipped with a steering control along with other suitable controls, not material here.

The unit 60b has coaxial threshing and separating portions 66b and 68b as before, and it will be understood that the interior components are the same as those described above. One difference exists in that the cleaning means 116b is coaxially disposed at the cylinder end of the unit rather than at the other end as in FIGS. 1–9. This means that the crop-transfer means 104b runs from left to right, rather than from right to left as previously described (considered from the position of an observer standing behind the machine and facing forwardly). See FIG. 12.

The chassis also carries a grain tank 62b to which the unit 60b delivers cleaned grain by a conveyor 148b. Other components as needed are supplied. These require no detailed description. Portions of the drive are shown but need not be elaborated.

In FIG. 13, the unit 60b, including the harvesting device 42b, is carried by an agricultural tractor 22c, typically having steerable front wheels 27c, traction wheels 26c, and a hydraulically operated hitch linkage including a rockshaft 40c, lift arms 41, lower links 43, lift links 45 and a top link 47. The unit made up of the harvesting device 42b and the thresher-separator apparatus 60b is here carried by a subframe, or vertically adjustable frame part 34c, in turn supported by the rear ends of the top and lower links 47 and 43, respectively. The tractor is modified to run reversely so that the traction wheels become the front wheels and the unit 42b–60b is at the front. A grain conveyor 148c leads from the cleaning means to a grain tank 62c carried on the tractor. An auxiliary operator's station 29c is added in the conversion of the vehicle, and the controls thereof are suitably connected to those of the basic tractor, as is conventional and therefore not shown and described in detail. Here, as in the case of FIGS. 10–12, the illustration is designed primarily to show the versatility of the thresher-separator unit and its adaptability to different vehicular environments. It will be clear of course that other types of harvesting devices could be substituted for the grain cutting type shown here; e.g., the so-called corn head which is conventionally used to "combine" corn as distinguished from snapping and picking. See for example, U.S. Patent No. 2,794,307, of June 4, 1957.

Features and advantages other than those outlined here will readily appear to those versed in the art, as will further modifications of the basic structure, all without departure from the spirit and scope of the invention.

What is claimed is:

1. A crop harvester, comprising: a main frame adapted to advance over a field; a harvesting device carried by the frame and including rearwardly directed crop-discharge means; threshing and separating apparatus carried by the frame and including generally cylindrical housing structure having coaxially adjacent but functionally separate threshing and separating portions and said threshing portion including an inlet in communication with said crop-discharge means, threshing means operative within the threshing portion and including a threshing cylinder journaled coaxially in said threshing portion, separating means operative within the separating portion and including a rotatable separating element journaled coaxially in said separating portion in substantially end-to-end relation to the cylinder, and crop-transfer means primarily in said threshing portion and separate from said cylinder and element for moving threshed crops from the threshing portion to the separating portion; and drive means connected to and for rotating said cylinder and element.

2. A crop harvester according to claim 1, in which: said housing structure has a portion eccentric to and in communication with the threshing and separating portion and the crop-transfer means is located in said eccentric portion.

3. A crop harvester according to claim 2, in which: the crop-transfer means is an auger rotatable on an axis parallel to the cylinder and extending from substantially the end of the cylinder remote from the element to at least the end of the cylinder adjacent to said element.

4. A crop harvester according to claim 2, in which: the crop-transfer means is an arcuate blade-like member partially surrounding the cylinder and extending circumferentially of the cylinder and also axially from substantially the end of the cylinder remote from the element to at least the end of the cylinder adjacent to said element.

5. A crop harvester according to claim 1, in which: said housing structure is radially enlarged in a part thereof generally axially coextensive with the cylinder and leading axially and radially inwardly to the cylinder-adjacent end of said element, and the crop-transfer means includes a substantially semi-helical blade-like member arcuate about the cylinder axis and located in and running circumferentially and axis-wise of said enlarged part.

6. A crop harvester according to claim 5, in which: said threshing portion includes a concave beneath and cooperative with the cylinder, and said enlarged part and member are disposed above the cylinder.

7. A crop harvester according to claim 1, including: crop-cleaning means carried by the frame; and second crop-transfer means for moving separated crops from the separating portion of said structure to said crop-cleaning means.

8. A crop harvester according to claim 7, in which: the crop-cleaning means includes a substantially cylindrical casing coaxial with the housing structure, and the second crop-transfer means is eccentric to said structure and casing.

9. A crop harvester according to claim 8, in which: the cylinder is located at one end of the element and said casing is located at the other end of said element.

10. A crop harvester according to claim 8, in which: the cleaning means includes a rotatable device within said casing and journaled on the axis of the cylinder and element.

11. A crop harvester according to claim 1, in which: the axis of said structure is transverse to the line of advance of the harvester and said structure is closely behind said device; a crop receptacle is carried by the frame adjacent to the housing structure; crop-cleaning means is carried by the frame adjacent to said structure; second crop-transfer means is provided for moving separated crops from the separating portion to the cleaning means; and third crop-transfer means is provided for moving cleaned crops from the cleaning means to the receptacle.

12. A crop harvester according to claim 1, in which: the axis of said structure is transverse to the line of advance, the harvesting device includes a trough also transverse to the line of advance and lying closely ahead of said housing structure, said inlet in the threshing portion being in a circumferential wall thereof and said trough having a first portion alined fore-and-aft with said inlet and including the crop-discharge means and a second portion lying closely ahead of the separating portion of said structure, and means operating over said trough to move crops laterally from the second portion to the first portion for discharge rearwardly to said inlet via said crop-discharge means.

13. A crop harvester according to claim 12, in which: the trough includes a third portion at the side of the first portion opposite said second portion and extending transversely beyond the threshing portion of said housing structure, and means is operative over said third portion to move crops laterally therefrom to the first portion for discharge rearwardly to said inlet via said crop-discharge means.

14. A crop harvester according to claim 1, in which: the cylinder and rotatable element are mounted on a common shaft and the drive means is connected to said shaft.

15. A crop harvester according to claim 1, in which: the axis of said housing structure is crosswise of the line of advance, said structure lies closely behind said device and said inlet is in a circumferential wall of the threshing portion and is disposed in fore-and-aft register with the crop-discharge means.

16. A crop harvester according to claim 15, in which: the frame includes a wheeled part and a vertically adjustable part carried by the wheeled part, and the harvesting device and threshing apparatus are carried on said adjustable part.

17. A crop harvester according to claim 16, in which: the wheeled part includes traction means and a power plant driving said traction means.

18. A crop harvester according to claim 1, including a crop-cleaning casing carried by the frame coaxially at one end of the housing structure, a rotatable device coaxially journaled in the casing, and crop-transfer means for moving separated crops from the separating portion to the cleaning casing.

19. A crop harvester according to claim 18, in which: the cleaning casing is at the end of the housing structure remote from the cylinder.

20. A crop harvester according to claim 18, in which: the cleaning casing is at the end of the housing structure adjacent to the cylinder.

References Cited by the Examiner
UNITED STATES PATENTS

| 2,169,472 | 8/1939 | Oehler et al. | 56—20 |
| 3,212,243 | 10/1965 | Mark et al. | 56—21 |
| 3,245,208 | 4/1966 | Mark et al. | 56—21 |

ABRAHAM G. STONE, *Primary Examiner.*

ANTONIO F. GUIDA, *Examiner.*